(12) United States Patent
Estival et al.

(10) Patent No.: US 11,344,970 B2
(45) Date of Patent: May 31, 2022

(54) OPTICAL DEVICE AND METHOD FOR DETECTING THE DRIFT OF A LIGHT BEAM

(71) Applicant: LASER ENGINEERING APPLICATIONS, Angleur (BE)

(72) Inventors: Sébastien Estival, Talence (FR); Paul-Etienne Martin, Bordeaux (FR)

(73) Assignee: LASER ENGINEERING APPLICATIONS, Seraing (BE)

( * ) Notice: Subject to any disclaimer, the term of this patent is extended or adjusted under 35 U.S.C. 154(b) by 94 days.

(21) Appl. No.: 17/040,436

(22) PCT Filed: Mar. 25, 2019

(86) PCT No.: PCT/EP2019/057425
§ 371 (c)(1),
(2) Date: Sep. 22, 2020

(87) PCT Pub. No.: WO2019/185542
PCT Pub. Date: Oct. 3, 2019

(65) Prior Publication Data
US 2021/0114137 A1  Apr. 22, 2021

(30) Foreign Application Priority Data
Mar. 27, 2018  (BE) .................................. 2018/5205

(51) Int. Cl.
*G01B 11/27* (2006.01)
*B23K 26/04* (2014.01)
(Continued)

(52) U.S. Cl.
CPC .......... *B23K 26/043* (2013.01); *B23K 26/705* (2015.10); *G01B 11/272* (2013.01); *G02B 27/10* (2013.01); *G02B 19/0009* (2013.01)

(58) Field of Classification Search
CPC ..... G01B 11/06; G01B 11/14; G01B 11/2441; G01B 11/255; G01B 11/272;
(Continued)

(56) References Cited

U.S. PATENT DOCUMENTS 5,424,834 A  6/1995 Akedo et al.
5,969,851 A  10/1999 Clark et al.
(Continued)

FOREIGN PATENT DOCUMENTS

CN  206177254 U  5/2017
EP  2538170 A1  12/2012

OTHER PUBLICATIONS

International Search Report dated Apr. 16, 2019, issued in corresponding International Application No. PCT/EP2019/057425, filed Mar. 25, 2019, 4 pages.
(Continued)

*Primary Examiner* — Isiaka O Akanbi
(74) *Attorney, Agent, or Firm* — Christensen O'Connor Johnson Kindness PLLC (57) ABSTRACT

An optical device for detecting the drift of a light beam of a laser machining system includes a beam splitter for obtaining a first light beam along a first optical path and a second light beam along a second optical path. The optical device further includes a focal module positioned at least partially along the first optical path to obtain a focused light beam that is directed towards a first light beam matrix detection means positioned in a focusing plane associated with the focal module. The optical device also includes an afocal module positioned at least partially along the second optical path to obtain a collimated light beam that is directed towards a second light beam matrix detection means.

19 Claims, 5 Drawing Sheets

(51) Int. Cl.
*B23K 26/70* (2014.01)
*G02B 27/10* (2006.01)
*G02B 19/00* (2006.01)

(58) Field of Classification Search
CPC ............ G01M 11/025; G01M 11/0271; B23K 26/043; B23K 26/705; G02B 27/10; G02B 19/0009
USPC ......... 356/138, 609, 614–624; 359/362, 641, 359/642
See application file for complete search history.

(56) References Cited

U.S. PATENT DOCUMENTS

| | | | |
|---|---|---|---|
| 6,014,206 A | 1/2000 | Basting et al. | |
| 6,721,094 B1* | 4/2004 | Sinclair | G01B 9/02082 359/368 |
| 6,785,203 B2* | 8/2004 | Maruyama | G11B 7/13922 |
| 2001/0022341 A1 | 9/2001 | Adachi et al. | |
| 2001/0028626 A1* | 10/2001 | Maruyama | G11B 7/1353 |
| 2002/0163716 A1 | 11/2002 | Birk et al. | |
| 2007/0123761 A1* | 5/2007 | Daly | A61B 3/1005 600/319 |
| 2016/0161410 A1* | 6/2016 | Keller | G01N 33/4833 435/287.3 |
| 2016/0345820 A1* | 12/2016 | Frisken | A61B 3/0025 |

OTHER PUBLICATIONS

Written Opinion of the International Searching Authority dated Apr. 16, 2019, issued in corresponding International Application No. PCT/EP2019/057425, filed Mar. 25, 2019, 5 pages.
International Preliminary Report on Patentability dated Sep. 29, 2020, issued in corresponding International Application No. PCT/EP2019/057425, filed Mar. 25, 2019, 1 page.

* cited by examiner

OPTICAL DEVICE AND METHOD FOR DETECTING THE DRIFT OF A LIGHT BEAM

TECHNICAL FIELD

According to a first aspect, the invention refers to an optical device for detecting the drift of a light beam. According to a second aspect, the invention refers to an optical system for the automatic alignment of a light beam. According to a third aspect, the invention refers to a method for positioning optical elements for the design of an optical device according to the first aspect.

PRIOR ART

U.S. Pat. No. 6,014,206 discloses an optical stabilization device for automatically adjusting the angular and lateral position of a light beam. The angular and lateral position of a light beam is detected by a measurement of the focused light beam and by an infinite measurement. A disadvantage of this stabilization device is that it requires large distances between the optical elements in order to have sufficient resolution of the lateral position shift and in particular the angular position shift.

The problem with the prior art light beam drift detection devices is that in order to provide satisfactory sensitivity, they require large optical distances resulting in significant space requirements. For example, an increase in the resolution of the angular position shift is obtained by moving the detector away from the light beam in order to increase the shift obtained on the optical detector.

SUMMARY

According to a first aspect, one of the purposes of this invention is to provide a compact optical device that allows good sensitivity in detecting a lateral and/or angular shift of a light beam.

To this end, the inventors propose an optical device for detecting the drift of a light beam of a laser machining system and comprising:
  a beam splitter for obtaining from said light beam:
  a first light beam along a first optical path, and
  a second light beam, along a second optical path;
  a focal module positioned at least partially along the first optical path of said first light beam to obtain from said first light beam a focused light beam, said focused light beam is directed towards a first light beam matrix detection means positioned in a focusing plane associated with said focal module;
  an afocal module positioned at least partially along the second optical path of the second light beam to obtain from said second light beam a collimated light beam, said collimated light beam is directed towards a second light beam matrix detection means.

Preferably, the invention allows both near-field and far-field measurements to be made. The near field of a laser beam can be understood as the region around the width of the beam with a minimum value (waist), for example at a focusing point. The far field concerns the beam profile away from the beam width having a minimum value (waist), i.e. at a distance from the focusing point that is large, for example with respect to the effective Rayleigh length. The far-field intensity profile reveals details of the beam divergence that, in the near field, can only be obtained with wave front measurements. Since it is not practical to access the far field directly, the invention proposes to use a second focusing means (lens or focusing mirror) to obtain an intensity profile in its focal plane that reveals a reduced version of the far field.

The advantage of the device of the invention for detecting the drift of a light beam is that it is particularly compact while allowing a high sensitivity for detecting an angular shift and/or detecting a shift in the position of the beam in a given plane. Indeed, this is possible thanks to the positioning of two optical matrix detectors that "look" at two different places from the same incident laser beam. For example, the leakage of the incident laser beam is focused and then, during its separated focusing in two to go to the two optical matrix detectors. One of the two optical matrix detectors is placed at the focal point, the other looks at the lens through a second lens that collimates the beam. In another example, the leakage of the incident laser is split in two and then a first beam is focused on a matrix optical detector and a second beam is passed through an afocal module to another detector. The afocal module preferably allows a control of the size of the second beam projected on the detector. Optically this corresponds to an infinite measurement and a local measurement. The device of the invention therefore makes it possible to create a virtual large distance between the two optical matrix sensors over a very small area, thus offering very high measurement accuracy with relatively short optical paths to the two optical matrix sensors. The optical device for detecting the drift of a light beam is therefore both compact and highly sensitive to direction or angle shifts, and position shift of a laser beam.

Another advantage of the device of the invention is that it can detect the alignment of beams with a large diameter. For example, the device of the invention may process beams with a diameter of the order of 30 mm, 25 mm, 20 mm, 15 mm . . . . Based on the size of the beam entering the device, the focal length ratio of the afocal module can be adjusted so that the second matrix sensor has a spot with a diameter in the range of 2 mm to 2.5 mm.

Another advantage of the system over the prior art systems is that the prior art systems generally include a free propagating channel, i.e. without an afocal module. Such a system could be as compact as the device of the invention by folding it back, i. e. by using many mirrors to ensure a sufficiently long free propagation. Often the prior art systems include either two free propagating channels or a channel with a converging lens on one channel and free propagating on the other. The prior art systems mean that the beam size of a laser machining system is limited by the size of the matrix detectors used. Detectors with a large detection surface can be used but at much higher costs. The optical device of the invention allows, thanks to the afocal module, to look at a large beam on a small detector since it reduces its size. The system of the invention therefore allows the use of smaller, less expensive detectors . . . .

The alignment device of the invention consists of two measuring channels (e. g. channel 1 and channel 2) each equipped with a first and a second matrix light beam detection means respectively. Preferably, both channels allow the detection of the beam position at infinity and locally, for example, this means measuring or locating the beam position in two different planes. From the measurements at infinity and locally, i. e. at positions in two different planes, it is possible to trace back to the position of the beam in a given plane and its direction. For example, the position of the beam in a given plane makes it possible to determine a lateral shift and the direction of a light beam makes it possible to detect a shift in the orientation or angular shift of a light beam. For example, such a device can be described as comprising:

a first channel comprising focusing means having a focal length $f_1$ defining a focused optical system for detecting the drift of said light beam in the far field;

a second channel comprising an afocal optical system for detecting the drift of said light beam in the near field and comprising:

a second light beam matrix detection means for detecting drift along said second channel;

a second focusing means having a focal length $f_2$;

a third focusing means having a focal length $f_3$;

said second and third focusing means being positioned such that an optical distance between said second and third focusing means is equal to $f_2+f_3$, so as to obtain from an incoming collimated light beam, a collimated light beam on said second light beam matrix detection means;

a beam splitter for separating the detection of the drift of said light beam to said first and second light beam matrix detection means.

For example, this embodiment can be described with the first and second focusing means forming a single focusing means, the beam separation device being positioned after the first focusing means, the first focusing means thus replacing the third focusing means.

The device of the invention allows to create a large distance between the two optical matrix detectors on a very small area, i.e. with relatively short optical paths between the first focusing means and the two optical detectors, the device of the invention allows an infinite measurement and a local measurement. This particularity of the optical device of the invention is possible thanks in particular to the positioning of the second focusing means with respect to the first focusing means such that their distance to the optical centre is equal to $f_1+f_2$. This makes it possible to obtain a compact optical device while offering a very high measurement accuracy.

For example, channel 1 consists of a first focusing means, for example a converging lens with a focal length $f_1$ and a first light beam matrix detection means. The first matrix detector is positioned in the focal plane of the first focusing means.

For example, channel 2 consists of two focusing means: the first focusing means common to channel 1 and a second focusing means, the two focusing means constituting an afocal optical system, an entrance pupil and a second light beam matrix detection means. The second light beam matrix detection means is placed in the image plane of the entrance pupil obtained via the afocal assembly, consisting for example of a first and a second converging lens. Preferably, a matrix detector is a CCD or CMOS sensor.

The light beam of a laser machining system of the invention is preferably collected or taken by positioning the optical device of the invention behind a mirror of a machining system, the residual transmission of the mirror of a machining system generates a light beam which is then directed towards the first focusing means in the form of a collimated incoming light beam. For example, the mirror of a machining system transmits a fraction of a light beam between 0.01% and 1%, preferably between 0.05% and 0.5% and even more preferably between 0.08% and 0.2%.

The first focusing means (first lens) is common to channels 1 and 2. The second focusing means allows the entrance pupil to be imaged on the second light beam matrix detection means. The first light beam matrix detection means makes it possible to detect the lateral position of the beam in a plane that is (theoretically) reflected to infinity. The second light beam matrix detection means is used to detect the beam position at the level of the plane of the entrance pupil.

Preferably, the two channels or the first and second light beams are separated by a beam splitter, for example a splitter cube (ordinary, non-polarizing, R=50%, T=50%), which is positioned between the first lens and the second lens. For example, the cube can be a polarizing cube R=50% of S, T=50% of P or vice versa.

Preferably, the first and second light beams retain the focus point defined by said focusing means. Preferably, the second focusing means defining a second focal length $f_2$ is positioned at a distance equal to the second focal length beyond the focusing plane of the second focused separated light beam. The second focusing means is positioned at a distance equal to the focal length $f_2$ of the focusing point of the second separated focused light beam to obtain from the second separated focused light beam a second separated collimated light beam.

Preferably, said focal module comprises a first focusing means having a focal length $f_1$ to obtain from said light beam a focused light beam in said focusing plane.

Preferably, said light beam of a laser machining system is a substantially collimated light beam.

Preferably, said focusing plane is located at a distance equal to said focal length $f_1$ of said first focusing means, so as to detect said focused light beam in its focusing plane.

Preferably, said focal module is positioned along the first optical path of said first light beam, in that said afocal module is positioned along the second optical path of the second light beam, and in that said afocal module comprises:

a second focusing means having a focal length $f_2$;

a third focusing means having a focal length $f_3$;

said second and third focusing means being positioned such that an optical distance between said second and third focusing means is equal to $f_2+f_3$, so as to obtain from said second light beam a collimated light beam on said second light beam matrix detection means.

Preferably, the separating means is positioned between said focusing means and said first light beam matrix detection means.

Preferably, the afocal module comprises:

said first focusing means having said focal length $f_1$;

a second focusing means having a focal length $f_2$;

said first and second focusing means being positioned such that an optical distance between said first and second focusing means is equal to $f_1+f_2$, so as to obtain from said second light beam a collimated light beam on said second light beam matrix detection means.

Preferably, said beam splitter is located at a distance of between 150 mm and 350 mm from the first focusing means, preferably at a distance of between 200 mm and 325 mm and even more preferably at a distance of between 250 mm and 320 mm and for example at a distance of 300 mm.

In a preferred embodiment, the second light beam matrix detection means is positioned at a different distance from the second focal length $f_2$ of the second focusing means.

For example, the second light beam matrix detection means is positioned at a different distance twice the second focal distance of the focus point of the second focused separated light beam.

Preferably, the beam splitter is configured to transmit the first light beam and to reflect the second light beam.

Preferably, the focal length $f_1$ is between 100 mm and 1000 mm, preferably between 200 mm and 800 mm, even more preferably between 300 mm and 600 mm and for example the focal length $f_1$ is 400 mm.

Preferably, the first focusing means is a converging lens.

Preferably, the second focusing means is a converging lens.

Preferably, the focal length $f_2$ is between 10 mm and 100 mm, preferably between 20 mm and 80 mm, even more preferably between 25 mm and 50 mm and for example the focal length $f_2$ is 30 mm.

Preferably, the focal length $f_1$ is between 100 mm and 1000 mm, preferably between 200 mm and 800 mm, even more preferably between 300 mm and 600 mm and for example the focal length $f_1$ is 400 mm.

Preferably, the focal lengths $f_1$ and $f_2$ of said first and second focusing means define a ratio $f_1/f_2$ such that:

$$1 < \frac{f_1}{f_2} < 20,$$

preferably:

$$7 < \frac{f_1}{f_2} < 16,$$

even more preferably:

$$9 < \frac{f_1}{f_2} < 14,$$

and for example:

$$\frac{f_1}{f_2} = \frac{40}{3}.$$

Preferably, the focal lengths $f_2$ and $f_3$ of said second and third focusing means define a ratio $f_2/f_3$ such that:

$$1 < \frac{f_2}{f_3} < 20,$$

preferably:

$$7 < \frac{f_2}{f_3} < 16,$$

even more preferably:

$$9 < \frac{f_2}{f_3} < 14,$$

and tor example:

$$\frac{f_2}{f_3} = \frac{40}{3}.$$

The focal length ratio of the afocal module is used to control the diameter of the beam entering the afocal module and the diameter of the collimated beam leaving. Preferably the incoming and outgoing beams of the afocal module are essentially collimated. Thus if the focal length ratio of the two focusing means comprised in the afocal module is equal to 10, for example $f_1/f_2$ or $f_2/f_3$ then a light beam entering the afocal module with a diameter of 10 mm emerges from the afocal module with a diameter of 1 mm. Thus, there is a direct correspondence between the ratio (e. g. $f_1/f_2$ or $f_2/f_3$) and the magnification or narrowing of the diameter of the light beam passing through the afocal module.

The advantage of using an afocal module with ratios as described in this document is that it has a device for detecting the drift of a light beam that can handle light beams from laser machining systems with large beam diameters. An advantage of the device of the invention is that it can use a matrix light beam detector with a relatively small detection area. For example, a matrix light beam detector according to the device of the invention for detecting a collimated beam allows detection according to a 4 mm by 4 mm square. This allows the detection of a shift on a smaller surface and requires a short optical path in the invention device. The prior art devices, for example, use detectors with a larger detection surface and requiring a greater distance.

Preferably, said second and third focusing means are converging lenses.

Preferably, the first matrix light beam detection means is positioned at a distance from the beam splitter of between 50 mm and 500 mm, preferably between 65 mm and 400 mm, even more preferably between 75 mm and 250 mm and for example 100 mm.

Preferably, the beam splitter is a splitter cube or a semi-reflective mirror.

Preferably, an entrance pupil is positioned upstream of said first focusing means. Preferably the entrance pupil corresponds to the first focusing means. The diameter of a converging lens will define an entrance pupil. Preferably, the light beam entering the invention's device has an inner diameter smaller than the diameter of the converging lens of the first or third focusing means. For example, an image of the entrance pupil at the second matrix light beam detection means corresponds to an image of the converging lens of the first or third focusing means. A converging lens image is an image taken in the main plane of the converging lens. The entrance pupil therefore corresponds to the plane in which the spot is imaged on the second matrix detector.

For example, the entrance pupil has a diameter of between 5 mm and 50 mm, preferably between 8 mm and 30 mm, more preferably between 10 mm and 25 mm and preferably between 12 and 20 mm.

Preferably, the collimated light beam on the second light beam matrix detection means is a spot essentially allowing a measurement of a lateral shift of said light beam from a laser machining system.

The spot on the second light beam matrix detection means corresponds to the diameter of the collimated beam obtained when the light beam passes through the second focusing means. The diameter of the spot on the second light beam matrix detection means is preferably different than the diameter of the beam on the first focusing means. Preferably, the diameter of the spot is smaller than the size of the detection matrix of the second detection means. Indeed, to detect a lateral shift, it is necessary to be able to detect a change in the position of the sport on the second matrix detection means.

Preferably, the first light beam that is focused by the focal module on the first light beam matrix detection means is a point essentially allowing a measurement of an angular shift of said light beam of a laser machining system.

If the beam alignment is maintained in a plane, then the point on the first matrix detector moves along a line. For example, such a displacement of the point along a line corresponding to a maximum displacement in a plane of the light beam is in the order of 100 µm.

The first light beam is focused by the focal module in a focusing plane. A focusing plane can be defined as a plane in which light rays incident parallel to the focusing lens converge at different angles of incidence with respect to the lens. Thus all focusing points, regardless of the angle of incidence, are in a focusing plane.

Preferably, the spot on said second light beam matrix detection means has a larger area than said point on said first light beam matrix detection means.

Preferably, the first focusing means, the beam splitter and said second focusing means constitute, for the light beam of a laser machining system directed towards the second focusing means, an afocal optical system.

Preferably, the second light beam matrix detection means is at a distance from the second focusing means different from the focal length $f_2$.

For example, the device of the invention can be described as follows: an optical device for detecting the drift of a light beam and comprising:
- a first focusing means having a focal length $f_1$ for obtaining from a collimated incoming light beam from said light beam a focused light beam, said focused light beam defining a focusing point at said focal length $f_1$;
- a beam splitter for splitting said focused light beam into a first focused light beam and a second focused light beam,
- a first light beam matrix detection means positioned at said focal distance $f_1$ of said first focusing means, so as to detect said first focused light beam at its focusing point, said beam splitter being located between said focused light beam and said first light beam matrix detection means along the paths of the first and second focused light beams;
- a second light beam matrix detection means for detecting said second focused light beam;

characterized in that said optical device comprises a second focusing means having a focal distance $f_2$, positioned between said beam splitter and said second light beam matrix detection means, such that the distance between said first and second focusing means, measured along the paths of said focused light beam and said second focused light beam, is equal to $f_1+f_2$, so as to obtain from said second separated focused light beam a second light beam collimated on said second light beam matrix detection means.

According to a second aspect, the invention refers to an optical system for the automatic alignment of a light beam of a laser machining system comprising:
- a second light beam splitter for collecting a portion of said light beam, said collected portion of said light beam being directed towards:
  an optical device according to the first aspect of the invention capable of detecting the drift of said light beam from said collected beam portion;
- a central unit for receiving a first information from said first matrix light beam detector and a second information from said second matrix light beam detector, said first and second information defining positions of said first light beam and the second collimated light beam on the first and second matrix light beam detectors;
- two motorized mirrors servo-controlled in position by said central unit according to said first and second information to align said light beam of a laser machining system.

The invention allows a very fast automatic alignment of the light beam because the optical device for detecting the drift of the light beam is very fast and allows, thanks to its high sensitivity, a very fast servo-controlling in angular and/or lateral position because it requires very few iterations of servo-control measurement to achieve an aligned light beam. Indeed, the prior art optical devices having the compactness of the device according to the first aspect of the invention do not allow good sensitivity and therefore require more iterations of servo-control measurement to achieve an aligned light beam. This also provides an optical system for the automatic alignment of a fast and compact light beam thanks to the compact and sensitive drift detection device according to the first aspect of the invention. The optical system for the automatic alignment of a light beam of the invention is preferably used in a laser machining machine for the machining of materials. The interest of the device and system according to the first and second aspects of the invention is to allow the manufacture of laser machining machines that are more compact and easier to build.

The different variants and advantages described for the device according to the first aspect of the invention apply to the optical system according to the second aspect, mutatis mutandis.

According to a third aspect, the invention refers to a method for positioning optical elements for the design of an optical device according to the first aspect. To this end, the inventors propose a method for positioning optical elements to detect the drift of a light beam of a laser machining system and comprising the following steps:
a. providing the following optical elements:
   a beam splitter for obtaining from said light beam:
   a first light beam along a first optical path, and
   a second light beam, along a second optical path;
   a focal module;
   an afocal module;
   a first light beam matrix detection means;
   a second light beam matrix detection means.
b. positioning said focal module at least partially along the first optical path of said first light beam to obtain from said first light beam a focused light beam, said focused light beam being directed towards said first light beam matrix detection means positioned in a focusing plane associated with said focal module;
c. positioning said afocal module at least partially along the second optical path of the second light beam to obtain from said second light beam a collimated light beam, said collimated light beam being directed towards a second light beam matrix detection means;

Preferably, the focal module comprises a first focusing means having a focal length $f_1$ to obtain from said light beam a focused light beam in said focusing plane.

Preferably, the afocal module comprises said first focusing means and a second focusing means and in that said method comprises the following additional step:
d. positioning said first and second focusing means such that they are separated by an optical distance equal to $f_1+f_2$ in order to obtain from the second light beam a second collimated light beam towards said second light beam matrix detection means.

Preferably, said afocal module comprises:
a second focusing means having a focal length $f_2$;
a third focusing means having a focal length $f_3$;

and in that said method comprises the following additional step:

d. positioning said second and third focusing means at an optical distance separating them equal to $f_2+f_3$, so as to obtain from said second light beam a collimated light beam on said second light beam matrix detection means.

The different variants and advantages described for the optical device and system according to the first and second aspects of the invention apply to the method according to the third aspect, mutatis mutandis.

Preferably, the first and second light beams retain the focus point defined by the first focusing means.

Preferably, the second focusing means defining a second focal length is positioned at a distance equal to the second focal length beyond the focusing point of the second focused light beam. Preferably, the second focusing means is positioned at a distance equal to the focal length $f_2$ of the focusing point of the second focused light beam to obtain a second collimated light beam from the second focused light beam.

BRIEF DESCRIPTION OF THE DRAWINGS

These aspects and other aspects of the invention shall be clarified in the detailed description of particular embodiments of the invention, with reference to the drawings of the figures, in which.

The drawings of the figures are not to scale. Generally, similar elements are denoted by similar references in the figures. The presence of reference numbers in the drawings cannot be considered restrictive, even when these numbers are indicated in the claims.

DETAILED DESCRIPTION OF CERTAIN EMBODIMENTS OF THE INVENTION

An incoming light beam 1 is for example a laser beam transmitted by a mirror of a laser machining system. The transmission by a mirror of a machining system is for example unavoidable and the system of the invention makes it possible to use the light beam transmitted by the mirror and which would be lost. Indeed, the light intensity not reflected by a mirror but transmitted is sufficient to detect a shift in position or an angular shift of a light beam. For example, for a machining laser beam with a power of 20 W reflected on a mirror, it can be reasonably estimated that this beam is transmitted with a power of about 20 mW. The light beam thus transmitted and attenuated by said mirror is then directed towards the optical device of FIG. 1a, 1b, 2, 3a or 3b.

Figures 1A, 1B:
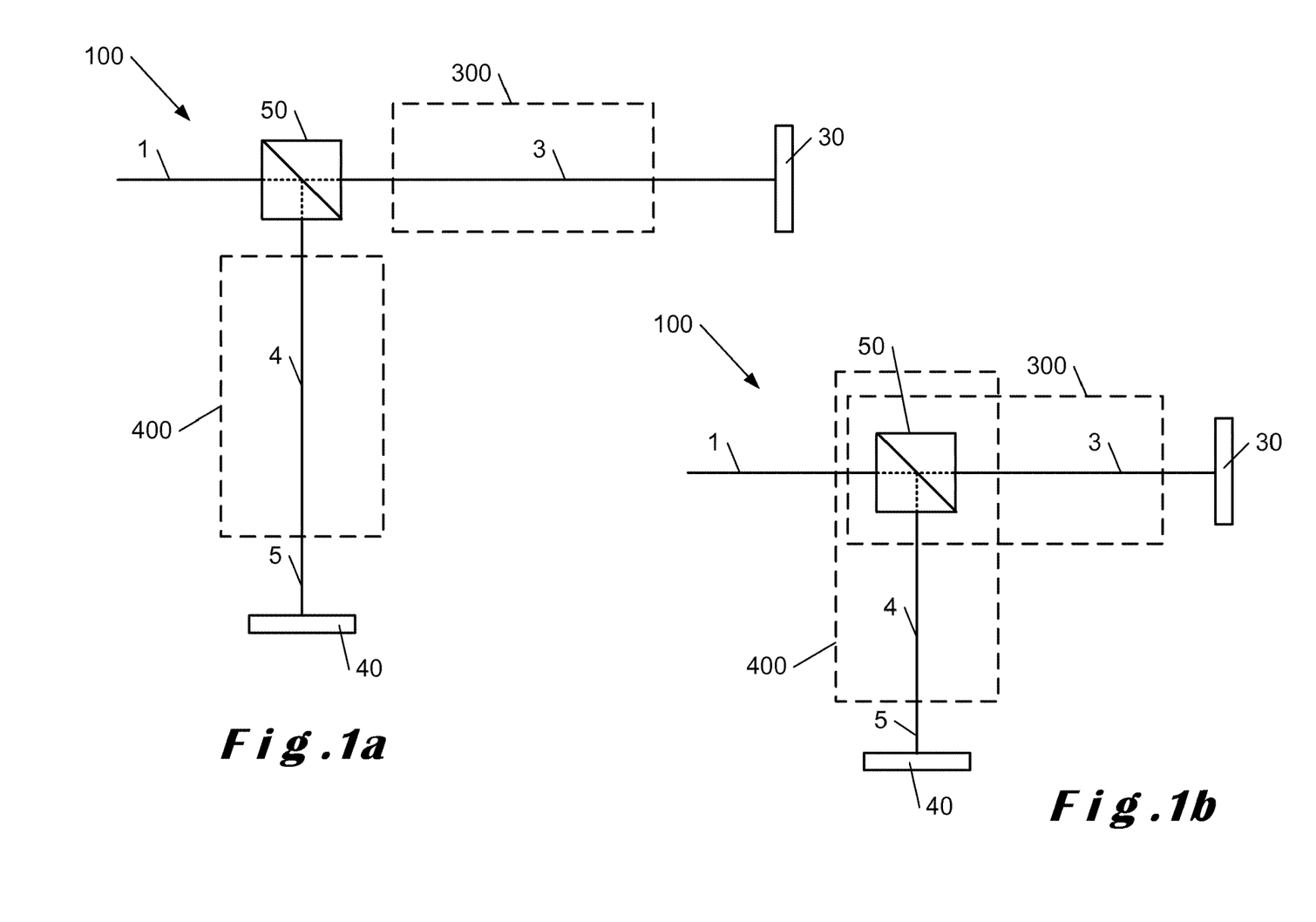
FIG. 1a and FIG. 1b show an embodiment of the optical device according to the first aspect of the invention.

FIG. 1a shows an example of embodiment of the device for detecting a shift of an incoming light beam 1 of a laser machining system. The incoming light beam is directed towards a beam splitter 50, separating the incident light beam 1 into a first light beam 3 which is transmitted by the beam splitter 50 and a second light beam 4 which is reflected by the beam splitter 50. The first light beam 3 passes through the focal module 300 and is then directed to the first matrix light beam detector 30 where its position is detected and converted into a first information 31. The first light beam 3 coming out of the focal module 300 is a focused light beam 2. This first information is then directed to a central unit 110. The second light beam 4 passes through the afocal module 400 and is then directed to the second matrix light beam detector 40 where its position is detected and converted into a second information 41. The second light beam 4 coming out of the afocal module 400 is a collimated light beam 5. This second information 41 is then directed to a central unit 110.

FIG. 1b shows an example of an embodiment of the device for detecting a shift of an incoming light beam 1 of a laser machining system. The incoming light beam is directed at a focal module 300 and an afocal module 400. The focal 300 and afocal 400 modules have the same common part which corresponds to the entering of the light beam into the focal 300 and afocal 400 modules. For example, the common part of the focal 300 and afocal 400 modules have a common part up to the beam splitter 50, splitting the incident light beam 1 into a first light beam 3 which is transmitted by the beam splitter 50 and a second light beam 4 which is reflected by the beam splitter 50. The first light beam 3 continues in the focal module 300 and is then directed to the first matrix light beam detector 30 where its position is detected and converted into a first information 31. The first light beam 3 coming out of the focal module 300 is a focused light beam 2, which is then directed to a central unit 110. The second light beam 4 continues in the afocal module 400 and is then directed to the second matrix light beam detector 40 where its position is detected and converted into a second information 41. The second light beam 4 coming out of the afocal module 400 is a collimated light beam 5. This second information 41 is then directed to a central unit 110. For example, the light beam splitter 50 is part of the focal module 300 and the afocal module 400.

Figure 2:
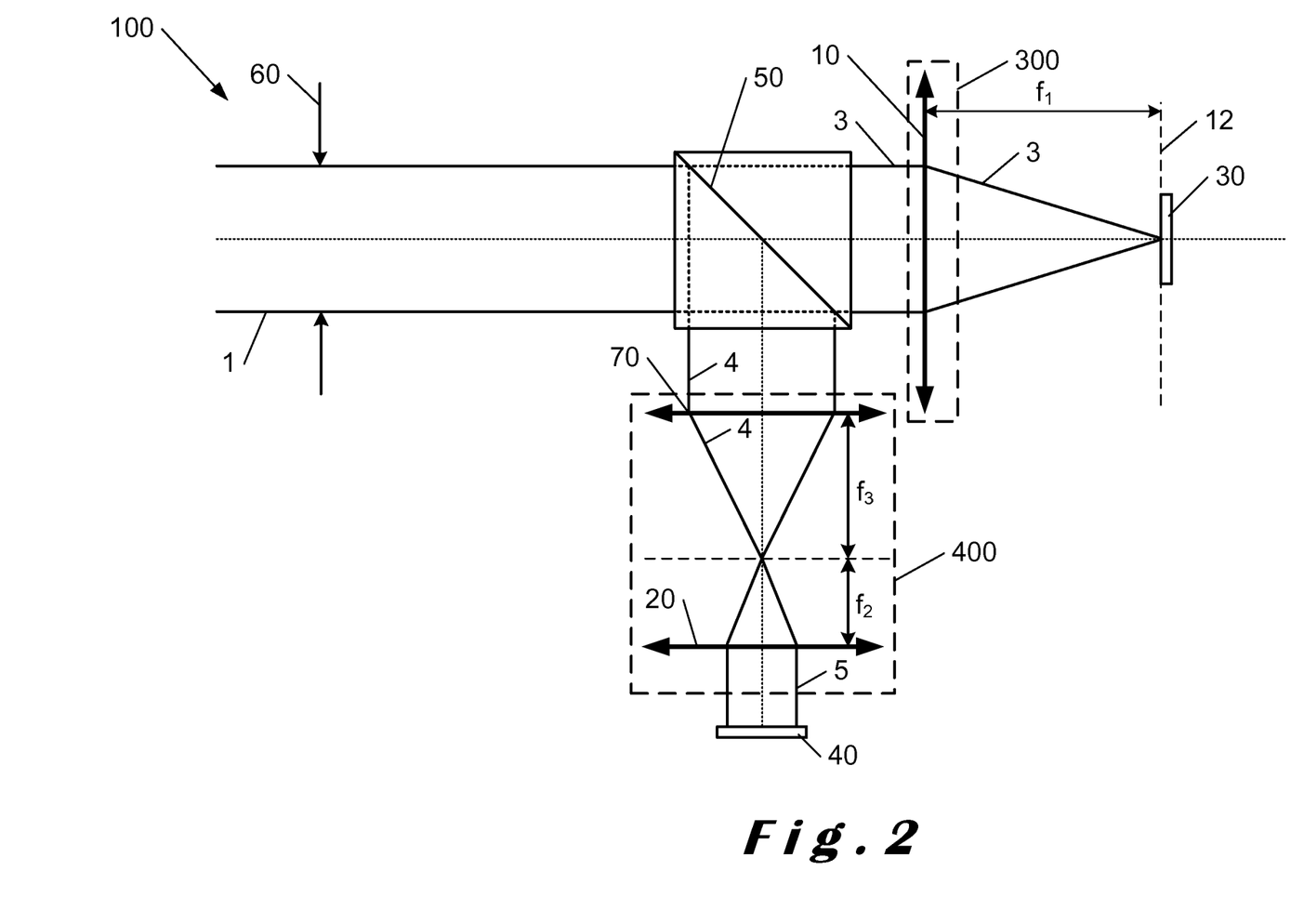
FIG. 2 shows an embodiment of the optical device according to invention.

FIG. 2 shows a detailed example of an embodiment of the device for detecting a shift of an incoming light beam 1 according to the invention. In this embodiment, the incoming beam 1 is directed towards the light beam splitter 50 separating the incident light beam 1 into a first light beam 3 which is transmitted by the beam splitter 50 and a second light beam 4 which is reflected by the beam splitter 50. The first light beam 3 passes through the focal module 300 comprising a first focusing means 10. The first light beam is then focused into a focused light beam 2 and then directed to the first matrix light beam detector 30 where its position is detected and converted into a first information 31. The first focusing means is preferably a converging lens positioned at a distance equal to its focal length $f_1$ of the first matrix light beam detector 30. Thus, the first light beam 3 coming out of the focal module 300 is a focused light beam 2. This first information 31 is then directed to a central unit 110. The second light beam 4 passes through the afocal module 400 and is then directed to the second matrix light beam detector 40 where its position is detected and converted into a second information 41. The afocal module 400 preferably comprises a third focusing means 70 and a second focusing means 20. The second 20 and third 70 focusing means are positioned at a distance equal to the sum of their two focal lengths $f_2$ and $f_3$. The second light beam 4 coming out of the afocal module 400 is therefore a collimated light beam 5. This second information 41 is then directed to a central unit 110. The focal length ratio $f_2/f_3$ allows you to change the size of the spot on the second matrix detector 40.

Figure 3A:
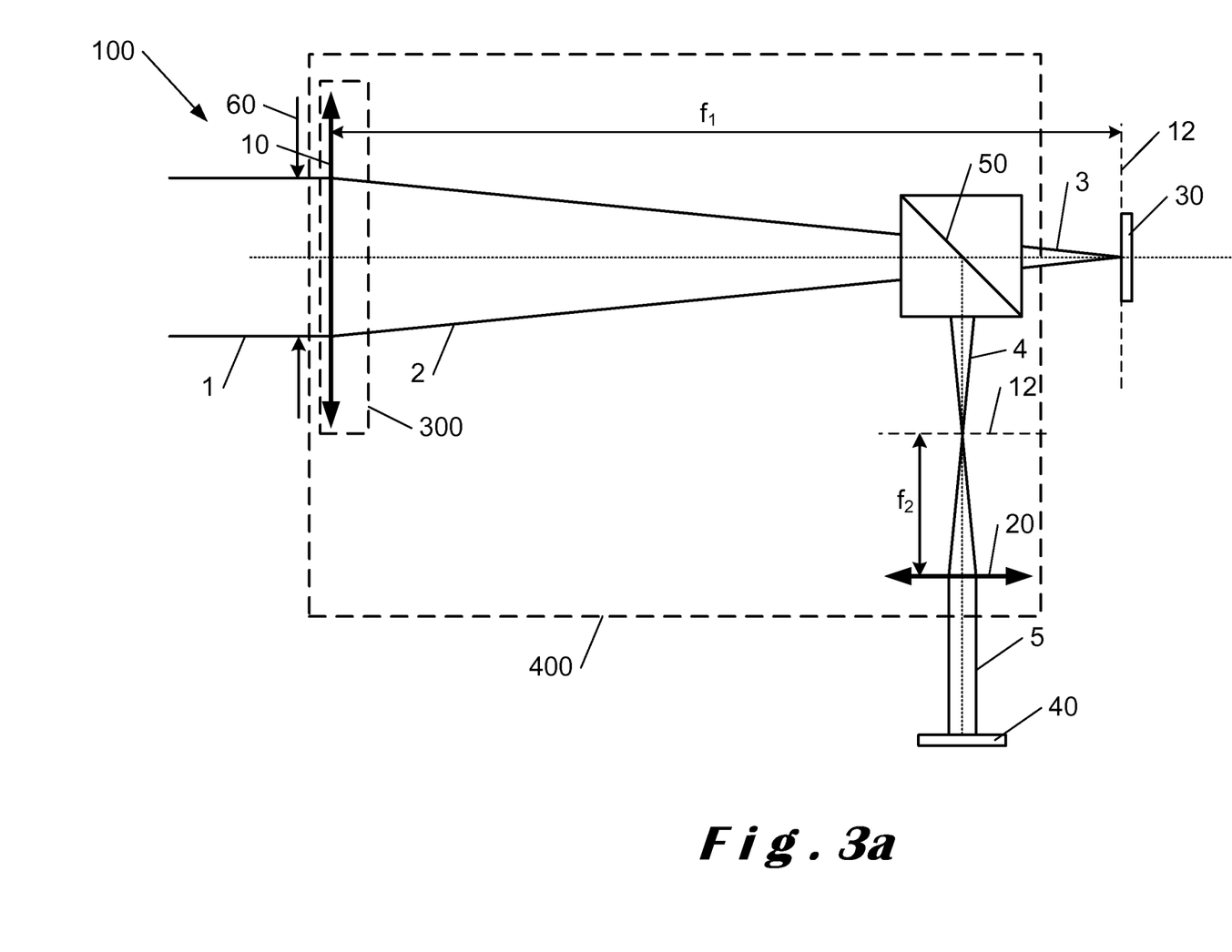
FIG. 3a and FIG. 3b show embodiments of the optical device according to the invention.

FIG. 3a shows an example of embodiment of the device for detecting a shift of an incoming light beam 1 according to the invention. The incoming light beam 1 is a collimated light beam. The collimated light beam 1 is directed towards the first focusing means 10 in order to obtain a focused light beam 2. The first focusing means 10 is preferably a converging lens. The first focusing means 10 has a focal length $f_1$. The focused light beam 2 is therefore focused in the focusing plane 12 located at a distance $f_1$ from the first focusing means 10. The focused light beam 2 as it passes through the beam splitter 50 is separated into two light beams, a first light beam 3 is for example transmitted and a second light beam 4 is for example reflected at an angle of 90° with respect to the incident beam 1. The beam splitting means 50 is for example a splitter cube reflecting 50% of the incident light beam 1 and transmitting 50% of the incident light beam 1. The focusing of the first light beam 3 and second light beam 4 is not modified by the splitting means 50. The focusing points 12 of the first light beam 3 and second light beam 4 are always located at a distance according to the optical paths imposed by the separation means 50 equal to the focal length $f_1$. Preferably the optical axes or optical paths of the first light beam 3 and second light beam 4, respectively the first and second optical paths describe an angle of 90° with respect to each other. The entrance pupil 60 represents a dimension of the first focusing means 10. Preferably, the incoming light beam 1 has a diameter smaller than the diameter of the entrance pupil 60.

A first light beam matrix detection means 30 is positioned in the focusing plane 12 of the first focusing means 10 so as to detect the first light beam 3. For example, the first light beam 3 focused on the first light beam matrix detection means 30 is a light point. The first light beam matrix detection means 30 is, for example, a CCD camera which makes it possible to determine the position of this light point. It is thus possible to determine, as a function of the position of the point on the first light beam matrix detection means 30, an angular shift of the incident light beam 1.

A second light beam matrix detection means 40 is positioned in the optical axis (or optical path) of the second light beam 4. A second focusing means 20 is positioned between the separating means 50 and the second light beam matrix detection means 40. The second focusing means 40 has a focal length $f_2$. The second focusing means 40 is preferably a converging lens with a focal length $f_2$. The second focusing means 20 is positioned with its optical centre aligned with the optical axis of the second light beam 4 such that the distance between the point or the focusing plane 12 of the second focused light beam 4 and the second focusing means 40 is equal to the focal distance $f_2$. Thus, the second focused light beam 4 is collimated after passing into the second focusing means 20. The collimated light beam 5 coming out of the second focusing means 20 then corresponds to a second collimated light beam 5 directed towards the second light beam matrix detection means 40. The second matrix light beam detection means 40 detects the second collimated light beam 5. Preferably the second light beam matrix detection means 40 is a CCD camera. Preferably the CCD camera 40 can detect a light spot corresponding to the collimated light beam 5.

The distance between the second matrix detector 40 and the second focusing means 20 is different from the focal length $f_2$, for example it is different from a few millimeters to a few centimeters so that the second matrix detector 40 does not see infinitely as the first matrix detector 30. The second matrix detector 40 would see infinitely if it were located at a distance equal to the focal length of the second focusing means 20. For example the second focusing means 20 has a focal length $f_2$ of between 10 mm and 200 mm, preferably between 15 mm and 100 mm, even more preferably between 20 mm and 50 mm and preferably equal to 30 mm. Preferably the second light beam matrix detection means 40 is positioned at a distance excluding the focal length $f_2$ from the second focusing means 20 with an exclusion distance centred around the focal length $f_2$, of 50 mm, preferably 30 mm, more preferably 20 mm and preferably 10 mm.

Figure 3B:
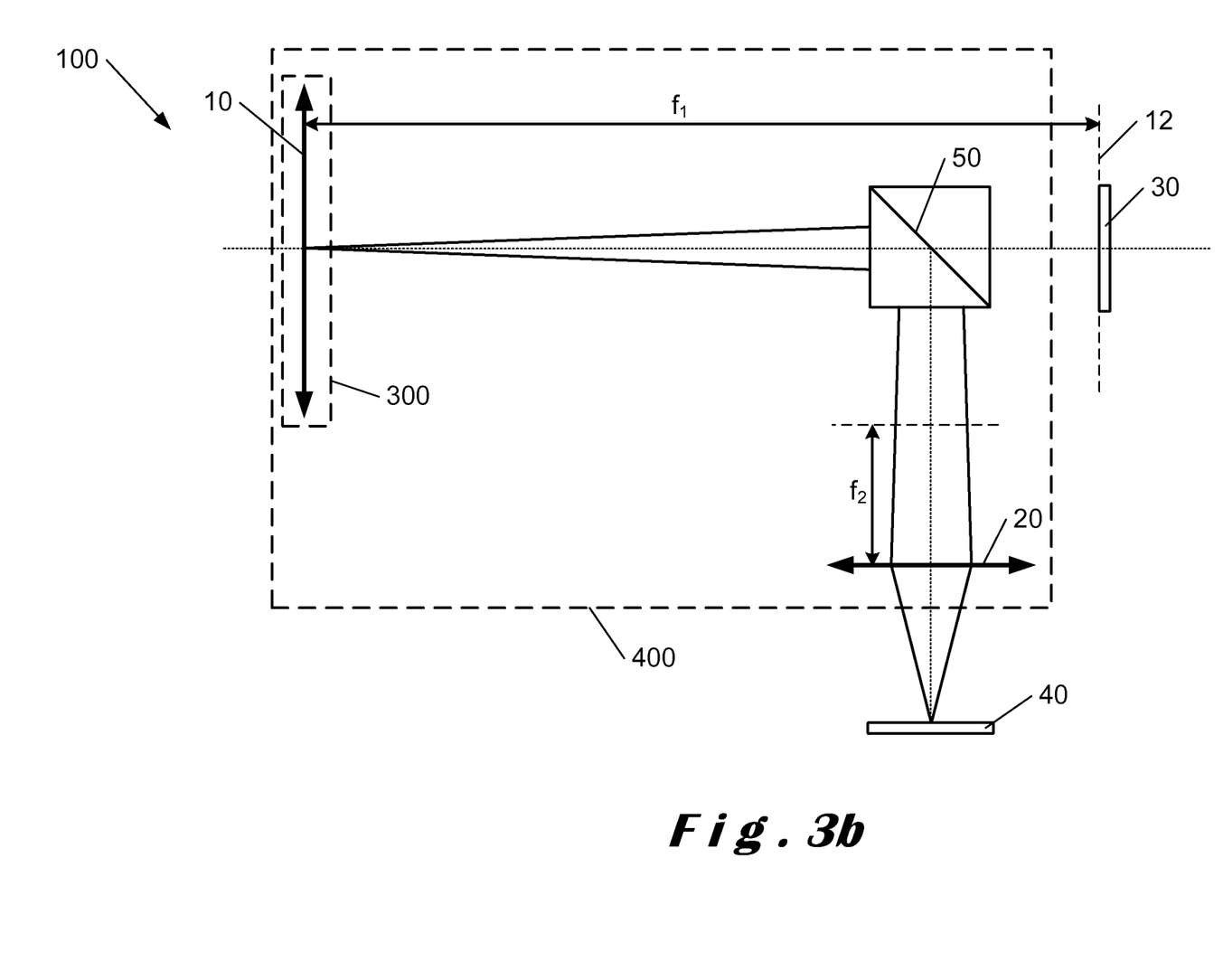

FIG. 3b shows an embodiment of the invention illustrating the path of a light beam defined by a point as a level of the first focusing means 10. Thus, FIG. 3b illustrates that all parts of a light beam entering the optical device of the invention 100 by the first focusing means 10 can be clearly detected by the second light beam matrix detection means 40. The advantage of detecting a clear light beam is that its size and position can be assessed very accurately. This makes it possible, for example, to evaluate its position and to deduce a position shift. Indeed, if the image formed on the optical matrix detector 40 is not clear, then the contours are blurred and it is difficult to define precisely the position of a spot as well as the dimensions of the spot. It is important that the second optical detector 40 is at a different distance from the second focusing means 20 because in the case where it is at the focal length $f_2$ then a spot corresponding to the incoming light beam 1 to infinity is observed. This would not allow a spot with clear edges and would not allow a good measure of a possible lateral shift of the incoming light beam 1. In the case of FIG. 3b, the second optical matrix detector 40 allows a local measurement, i. e. a measurement of the beam on the first focusing means 10, e. g. a converging lens. Thus the second optical matrix detector 40 allows to measure the position and size of the incoming light beam 1 on the lens 10. For example, the second matrix detector 40 provides an image of a spot corresponding to a measurement that would be made by placing the second detector 40 in the plane of the first focusing means 10.

The device of the invention illustrated in FIGS. 3a and 3b makes it possible to create a large distance between the two optical matrix detectors 30, 40 in a very small area, i.e. with optical paths between the first focusing means 10 and the two optical detectors 30, 40 relatively short, making it possible to obtain a compact optical device while offering a very high measurement accuracy.

Figure 4:
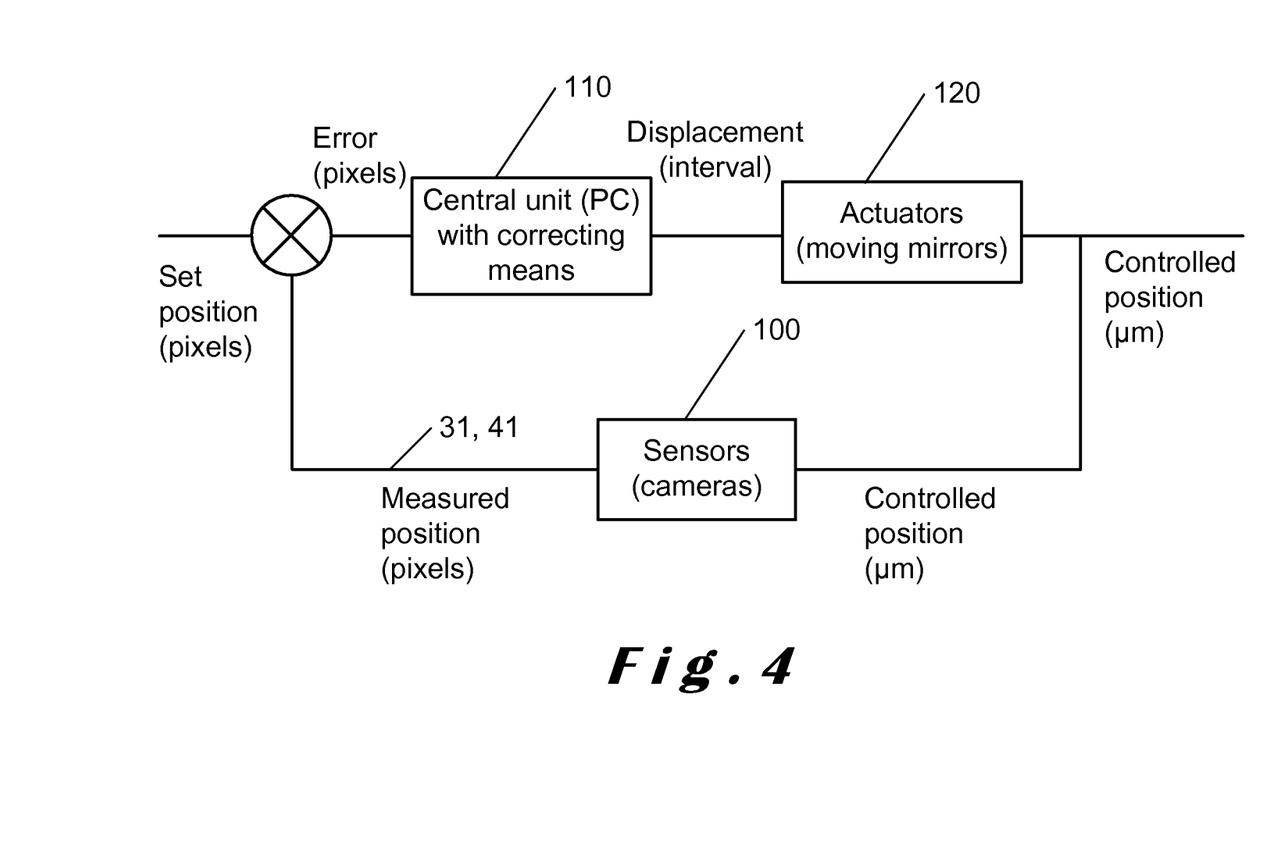
FIG. 4 shows an embodiment of the optical system according to the second aspect of the invention.

FIG. 4 shows an embodiment of the optical system according to the second aspect of the invention comprising the optical device 100 for detecting light beam shift according to the first aspect.

For example, a light beam from an optical system is collected by positioning itself behind a mirror of said optical system. This light beam is then sent to the light beam drift detection device 100 so that information can be sent back to a central unit 110. The information that can be defined as the first 31 and second 41 information defines the positions of the first light beam 3 and the second collimated light beam 5 on the first 30 and second 40 matrix light beam detectors. The collection of these first 31 and second 41 information makes it possible to know the position of the light beam in two different planes and thus to discriminate a lateral beam shift and an angular or directional shift of the beam. The central unit 110 allows this discrimination to be achieved by combining said first 31 and second 41 information. When a shift in the light beam is detected, the central unit 110 generates a command to the actuators of the moving mirrors 120 to correct the observed shifts. For example, two motorized mirrors 120 are servo-controlled in position by the central unit 110 according to the first 31 and second 41 information to align the light beam. The motorized mirrors are positioned upstream of the mirror to collect the light beam used to observe the shift of the light beam. This allows several iterations to be carried out in order to have a light beam in a machining machine that is as aligned as possible with a reference position of the beam.

The central unit 110 of the automatic light beam alignment system analyses the information from the first 31 and second 41 information from the first 30 and second 40 optical matrix detectors respectively, so as to establish a lateral shift between a reference position and the measured position. Such a lateral shift is for example expressed in pixels and could also be referred to as a measured position error. By combining the lateral shifts observed by the two matrix detectors 30, 40, the central unit 110 sends a signal to the servo mirrors 120, said signal including information allowing the correction of the observed shifts. A reference position can also be expressed in pixels in order to be easily compared by the central unit 110 to the shifts measured in pixels by the matrix detectors 30, 40. Thus the beam servo-controlled by the moving mirrors 120 is re-detected by the optical system for automatic alignment of the light beam in order to validate the correction of the shift caused by the repositioning of the moving mirrors 120. In the event that a beam shift remains, a new iteration for the correction of the light beam shift is provided by the system. When the system according to the second aspect of the invention achieves a good alignment of the light beam, then the system ensures that the alignment of the beam persists. In the event that misalignment is observed, then the central unit 110 sends a signal to the moving mirrors 120 so that the correct alignment is restored.

This invention has been described in relation to specific embodiments, which are purely illustrative and should not be considered restrictive. In general, this invention is not limited to the examples illustrated and/or described above. The use of the verbs "comprise", "include", or any other variant, as well as their conjugations, cannot in any way exclude the presence of elements other than those mentioned. The use of the indefinite article "a", or the defined article "the", to introduce an element does not exclude the presence of a plurality of these elements. The reference numbers in the claims do not limit their scope.

In summary, the invention can also be described as follows. Optical device for detecting the drift of a light beam of a laser machining system and comprising:
a beam splitter to obtain:
  a first light beam along a first optical path, and
  a second light beam, along a second optical path;
a focal module positioned at least partially along the first optical path to obtain a focused light beam, said focused light beam is directed towards a first matrix light beam detection means positioned in a focusing plane associated with said focal module;
an afocal module positioned at least partially along the second optical path to obtain a collimated light beam, said collimated light beam is directed to a second light beam matrix detection means.

The invention claimed is:

1. An optical device for detecting the drift of a light beam of a laser machining system and comprising:
a beam splitter for obtaining from said light beam:
  a first light beam along a first optical path, and
  a second light beam along a second optical path;
a focal module positioned at least partially along the first optical path of said first light beam to obtain from said first light beam a focused light beam, said focused light beam being directed towards a first light beam matrix detection means positioned in a focusing plane associated with said focal module; and
an afocal module positioned at least partially along the second optical path of the second light beam to obtain from said second light beam a collimated light beam, said collimated light beam being directed towards a second light beam matrix detection means.

2. The optical device according to claim 1, wherein said focal module comprises a first focusing means having a focal length $f_1$ to obtain from said light beam a focused light beam in said focusing plane.

3. The device according to claim 2, wherein said focal length $f_1$ is between 100 mm and 1000 mm.

4. The optical device according to claim 2, wherein said light beam of a laser machining system is a substantially collimated light beam.

5. The optical device according to claim 4, wherein said focusing plane is located at a distance equal to said focal length $f_1$ of said first focusing means, so as to detect said focused light beam in its focusing plane.

6. The optical device according to claim 1, wherein said focal module is positioned along the first optical path of said first light beam, wherein said afocal module is positioned along the second optical path of the second light beam, and said afocal module comprises:
a second focusing means having a focal length $f_2$; and
a third focusing means having a focal length $f_3$,
said second and third focusing means being positioned such that an optical distance between said second and third focusing means is equal to $f_2+f_3$, so as to obtain from said second light beam a collimated light beam on said second light beam matrix detection means.

7. The device according to claim 6, wherein said focal length $f_2$ is between 10 mm and 100 mm.

8. The device according to claim 6, wherein the focal lengths $f_2$ and $f_3$ of said second and third focusing means define a ratio $f_2/f_3$ such that $$1 < \frac{f_2}{f_3} < 20.$$

9. The device according to claim 1, wherein said beam splitter is located at a distance of between 150 mm and 350 mm from the first focusing means, preferably at a distance of between 200 mm and 325 mm and even more preferably at a distance of between 250 mm and 320 mm and for example at a distance of 300 mm.

10. The device according to claim 1, wherein said second light beam matrix detection means is positioned at a different distance from said second focal length $f_2$ of said second focusing means.

11. The device according to claim 10, wherein the focal lengths $f_1$ and $f_2$ of said first and second focusing means define a ratio $f_1/f_2$ such that:

$$1 < \frac{f_1}{f_2} < 20.$$

12. The device according to claim 1, wherein said focal length $f_1$ is between 100 mm and 1000 mm.

13. The device according to claim 1, wherein said first matrix light beam detection means is positioned at an optical distance from the beam splitter of between 50 mm and 500 mm.

14. The device according to claim 1, wherein said first separated focused light beam on said first light beam matrix detection means is a point, essentially allowing a measurement of an angular shift of said light beam.

15. An optical system for the automatic alignment of a light beam of a laser machining system, comprising:
  a second light beam splitter configured to collect a portion of said light beam, said collected portion of said light beam being directed towards:
  an optical device according to claim 1 capable of detecting the drift of said light beam from said collected beam portion;
  a central unit configured to receive a first information of said first matrix light beam detector and a second information from said second matrix light beam detector, said first and second information defining positions of said first light beam and said second collimated light beam on said first and second matrix light beam detectors; and
  two motorized mirrors servo-controlled in position by said central unit according to said first and second information to align said light beam of a laser machining system.

16. A method for positioning optical elements to detect the drift of a light beam of a laser machining system, the method comprising the steps of:
  a. providing the following optical elements:
    a beam splitter configured to obtain from said light beam:
      a first light beam along a first optical path, and
      a second light beam, along a second optical path;
    a focal module;
    an afocal module;
    a first light beam matrix detection means; and
    a second light beam matrix detection means;
  b. positioning said focal module at least partially along the first optical path of said first light beam to obtain from said first light beam a focused light beam, said focused light beam being directed towards said first light beam matrix detection means positioned in a focusing plane associated with said focal module; and
  c. positioning said afocal module at least partially along the second optical path of the second light beam to obtain from said second light beam a collimated light beam, said collimated light beam being directed towards a second light beam matrix detection means.

17. The method according to claim 16, wherein said focal module comprises a first focusing means having a focal length $f_1$ to obtain from said light beam a focused light beam in said focusing plane.

18. The method according to claim 16, wherein said afocal module comprises said first focusing means and a second focusing means the method further comprising the step of:
  d. positioning said first and second focusing means such that they are separated by an optical distance equal to $f_1+f_2$ in order to obtain from the second light beam a second collimated light beam towards said second light beam matrix detection means.

19. The method according to claim 16, wherein said afocal module comprises:
  a second focusing means having a focal length $f_2$; and
  a third focusing means having a focal length $f_3$, wherein the method further comprises the step of:
  d. positioning said second and third focusing means at an optical distance separating them equal to $f_2+f_3$, so as to obtain from said second light beam a collimated light beam on said second light beam matrix detection means.

* * * * *